United States Patent [19]
Negherbon et al.

[11] Patent Number: 6,155,125
[45] Date of Patent: *Dec. 5, 2000

[54] METHOD OF CONVERTING AN EXISTING FIVE-SPEED V-TWIN MOTORCYCLE TRANSMISSION TO A SIX-SPEED OVERDRIVE TRANSMISSION

[75] Inventors: Matthew Stephen Negherbon, Morgan Hill; Robert Burns Bossler, Jr., Hacienda Heights; Arthur Carl Williams, Burbank; Daniel Stern, San Jose, all of Calif.

[73] Assignee: Custom Chrome, Inc., Morgan Hill, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/098,014

[22] Filed: Jun. 15, 1998

[51] Int. Cl.$^7$ ..................................................... F16H 3/08
[52] U.S. Cl. ........................................... 74/325; 74/606 R
[58] Field of Search ............................. 74/606 R, 337.5, 74/356, 325

[56] References Cited

U.S. PATENT DOCUMENTS

| | | | |
|---|---|---|---|
| 2,316,477 | 4/1943 | Weaver | 180/33 |
| 3,563,353 | 2/1971 | LoPresti et al. | 192/21 |
| 4,157,044 | 6/1979 | Peltz | 74/356 |
| 4,373,601 | 2/1983 | Onda et al. | 74/337.5 X |
| 4,491,031 | 1/1985 | Ooka | 74/337.5 |
| 4,606,310 | 8/1986 | Makino | 123/192 |
| 5,542,309 | 8/1996 | Wenger et al. | 74/337.5 |

FOREIGN PATENT DOCUMENTS

| | | | |
|---|---|---|---|
| 0 79 176 A2 | 1/1983 | European Pat. Off. | F16H 3/08 |
| 62177339 | 4/1987 | Japan | F16H 6/06 |
| 111063167 | 5/1999 | Japan | F16H 55/17 |
| 208370 | 12/1923 | United Kingdom . | |
| 254880 | 7/1926 | United Kingdom . | |

OTHER PUBLICATIONS

European Car, "VW Tech: Take 6: An extra gear for quieter cruising", pp. 66–68, Sep. 1996.
PCT Form PCT/ISA/206 and Annexed Partial International Search Report.

*Primary Examiner*—Khoi Q. Ta
*Attorney, Agent, or Firm*—Thompson & Knight L.L.P.; Max Ciccarelli

[57] ABSTRACT

A six speed gear assembly is having a mainshaft, countershaft, mainshaft 1st–6th gears, countershaft 1st–6th gears, and 4th/6th gear shift member. A shifting assembly with a shifter cam having uniformly distributed and uniformly shaped detents that are engaged by the shift cam follower. The six speed gear assembly has modes of operation corresponding to six speeds (1st through 6th) and a neutral position. The sixth speed is an overdrive speed (the output from the transmission turns faster than the input to the transmission), while the first through fifth speeds correspond to conventional gear ratios.

The six speed gear assembly and the shifting assembly fit within the transmission case of a Big Twin five speed transmission without the need to modify the transmission case. This allows the conversion of a Big Twin five speed transmission into a six speed transmission without removal or replacement of the transmission case and by replacing a minimal number of components.

1 Claim, 11 Drawing Sheets

NEUTRAL

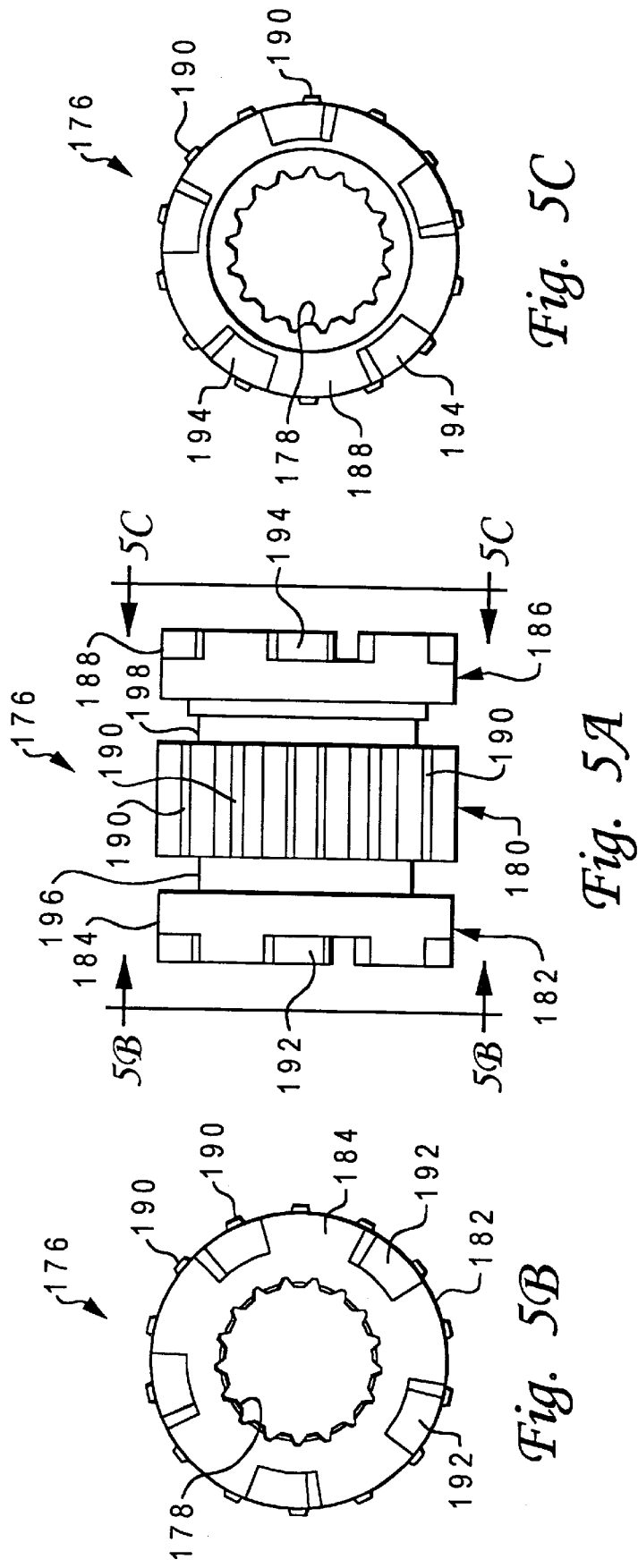

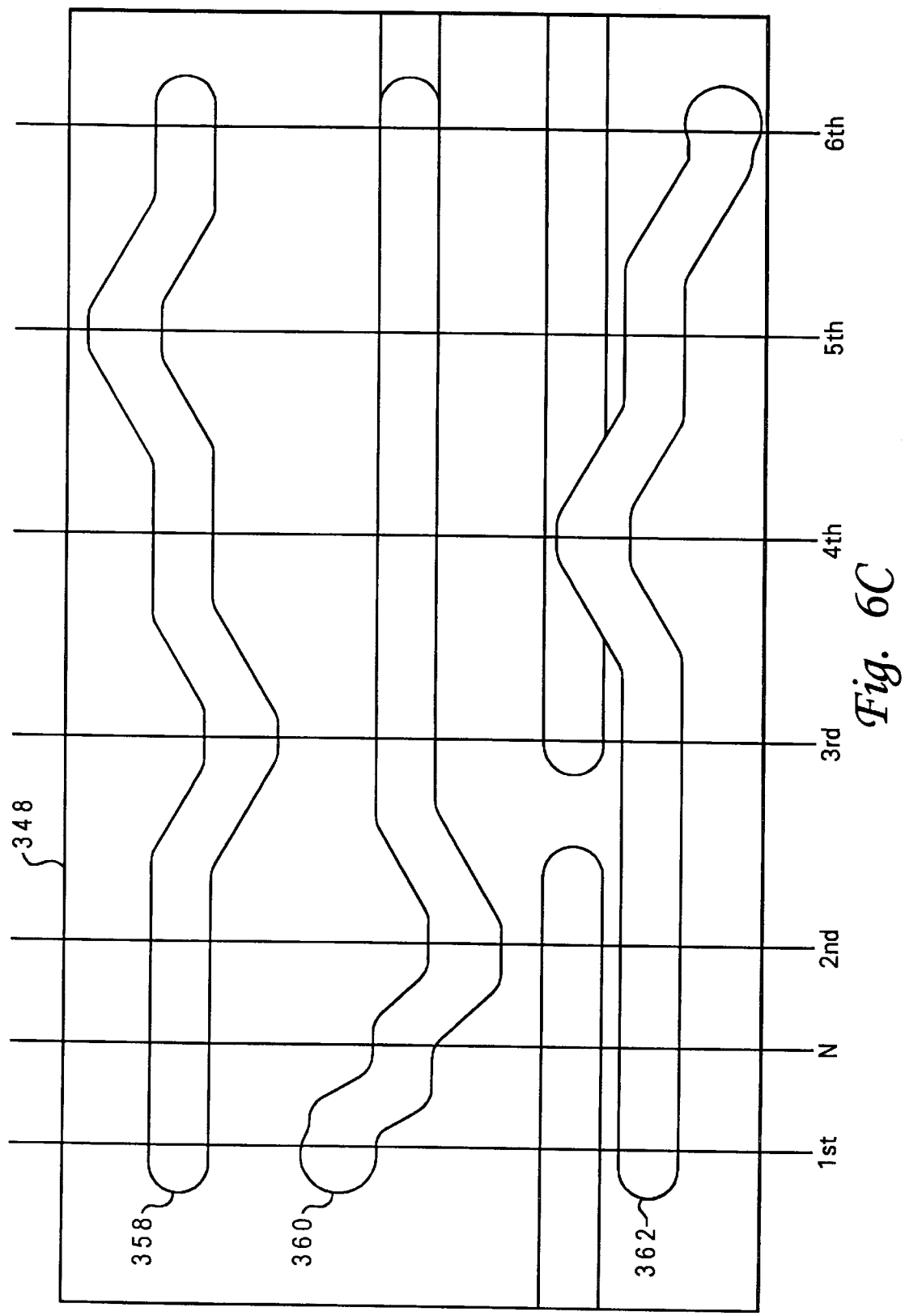

1st GEAR

2nd GEAR

3rd GEAR

4th GEAR

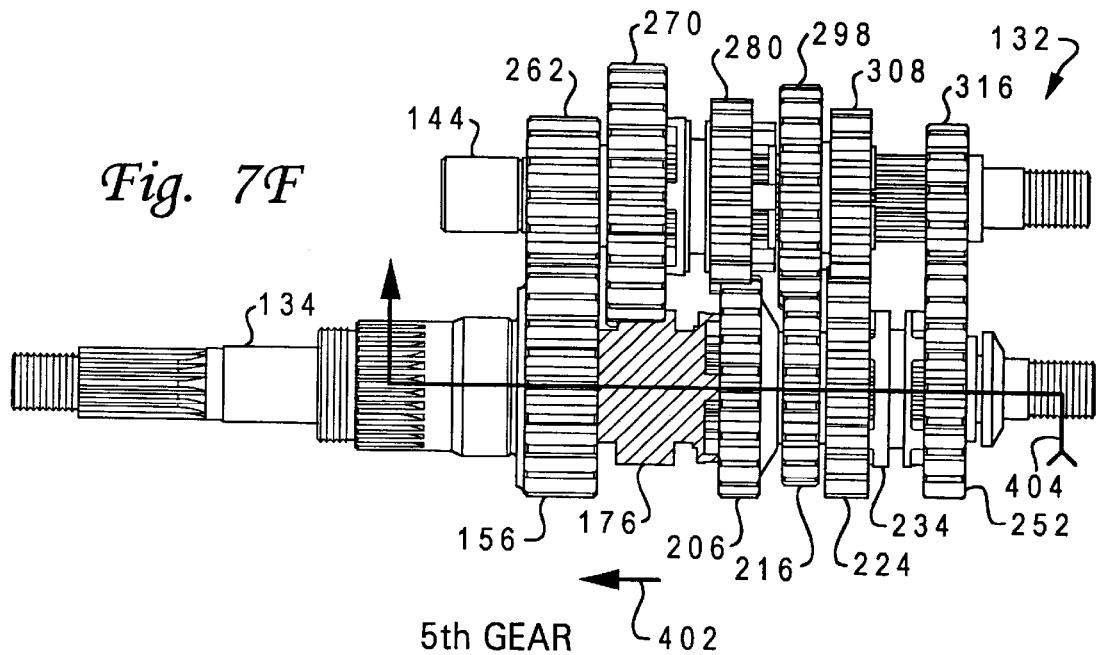
Fig. 7F — 5th GEAR
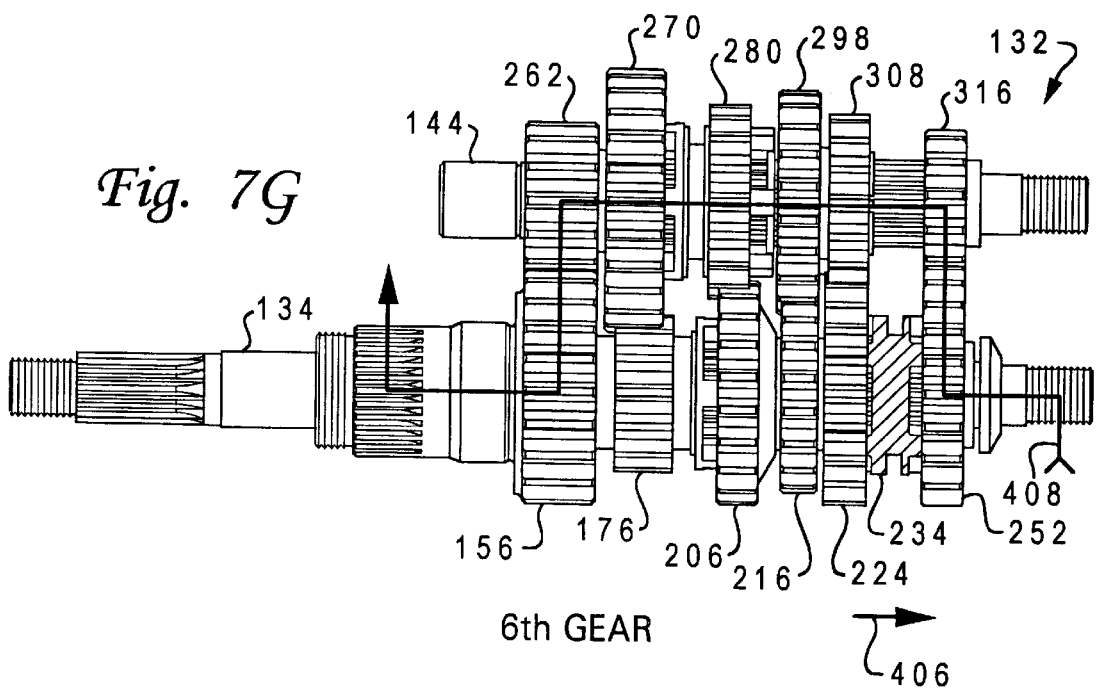
Fig. 7G — 6th GEAR

METHOD OF CONVERTING AN EXISTING FIVE-SPEED V-TWIN MOTORCYCLE TRANSMISSION TO A SIX-SPEED OVERDRIVE TRANSMISSION

BACKGROUND OF THE INVENTION

1. Field of the Invention

This invention relates in general to motorcycle transmissions and in particular to motorcycle transmissions used on Harley-Davidson® Big Twin motorcycles, which have transmission cases that are characterized by being separate from the engine case and having concentric input and output members disposed on the same side of the transmission.

2. Description of the Prior Art

Different manufacturers of motorcycles, and different models from the same manufacturer, use different types and configurations of transmissions. The particular type of transmission used depends, amongst other things, on the history of the particular motorcycle, its intended uses, and it physical characteristics. Harley-Davidson® Big Twin motorcycles have a rather unique transmission in that the transmission case is truly separate from the engine case.

A brief description of the Harley-Davidson® Big Twin five speed transmission will help in understanding the present invention.

Referring first to FIG. 1A, the major components of a prior art Big Twin five speed transmission are shown in a partially exploded view. Many of the smaller components, which are well known to those skilled in the art, are not shown for clarity. A Big Twin five speed transmission case 10 is shown. The particular transmission case depicted as 10 is for Softail® models from 1989 to at least 1998; however, the invention is equally applicable to transmission cases for all other Softail® vintages and the other Big Twins (e.g. Softail®, Dyna®, FXR, and FLT), due to the large similarity. The transmission cases for the various Big Twins vary only in a few external dimensions that relate mainly to the attachment of the transmission case to, and fitment of the transmission case around, the particular frame and surrounding components of the particular Big Twin. The inner cavity and components of the transmissions for the various Big Twins are otherwise almost identical.

Transmission case 10 has a housing 12 with a central portion 14, left side wall 16, and a removable right side wall (or trapdoor) 18 defining a cavity 20. Recess 22 is located in left side wall 16 for receiving the left mainshaft case bearing 42, and recess 28 is located adjacent recess 22 for receiving the left countershaft case bearing 44. Recess 30 is located in trapdoor 18 for receiving the right mainshaft trapdoor bearing 46, and recess 36 is located adjacent recess 30 for receiving the right countershaft trapdoor bearing 48.

Referring still to FIG. 1A, five speed gear set 60 comprises mainshaft (or driveshaft) 62, countershaft 64, mainshaft 5th gear (also referred to as driveshaft drive gear or driveshaft output gear) 66, mainshaft 2nd gear 68, mainshaft 3rd gear 70, mainshaft 1st gear 72, mainshaft 4th gear 74, countershaft 5th gear 76, countershaft 2nd gear 78, countershaft 3rd gear 80, countershaft 1st gear 82, and countershaft 4th gear 84. Some of the components of five speed gear set 60 are not shown or are hidden from view; for example, split case bearings, retaining rings, thrust washers, and spacers.

To install five speed gear set 60 into transmission case 10, mainshaft 62 and countershaft 64 are first secured to trapdoor 18 by means of hex nuts 52. Right mainshaft trapdoor bearing 46 supports the right end of mainshaft 62. Right countershaft trapdoor bearing 48 supports the right end of countershaft 64. The gears and related hardware (split case bearings, retaining rings, thrust washers, and spacers) are then positioned about the mainshaft 62 and countershaft 64. Then, trapdoor 18, with five speed gear set 60 secured thereto, is fastened to the housing (by conventional fasteners which are not shown).

When five speed gear set 60 is installed into transmission case 10, the outer bearing surface 86 of mainshaft 5th gear 66 is secured by the left mainshaft case bearing 42. Mainshaft 5th gear bearings 50 (not shown in FIG. 1A, but well know in the industry) keep mainshaft 62 concentric with mainshaft 5th gear 66. The outer splined portion 88 of the mainshaft 5th gear 66 and the left end of mainshaft 62 protrude outside of transmission case 10. The left end of countershaft 64 is received by left countershaft case bearing 44.

Referring still to FIG. 1A, shifting assembly 94 is shown. Shifting assembly 94 comprises shifter cam 96 supported by left and right shift cam support towers 110 and 112. The shift grooves 98, 100, 102 are shown, but, for convenience, have not been accurately depicted because they are well known. Left and right shift cam support towers 110 and 112 are connected to the top of housing 12. Shifter forks 114, 116, and 118 are supported by shift fork shaft 120, which is in turn supported by shift fork shaft support holes 122 and 124.

In operation, when the shifter shaft (not shown) rotates in response to the rider operating the shift lever (not shown), the shifter pawl (not shown) acts against the shift pins 104 causing shifter cam 96 to rotate. The interaction of shift cam follower 108 and detents 106 biases the shifter cam 96 to predetermined angular positions of the shifter cam 96. The rotation of shifter cam 96 causes one or more of shifter forks 114, 116, 118 to move axially along shift fork shaft 120, in turn causing the appropriate gear members to move axially along either mainshaft 62 or countershaft 64, causing a change in the gear ratio.

Referring now to FIG. 1B, a schematic horizontal cross section of empty transmission case 10 is shown to better illustrate the location of, and respective distances between, bearings 42, 44, 46, and 48. Left countershaft case bearing 44 is pressed into recess (or hole) 28. Left mainshaft case bearing 42 is held in position within recess 22 by bearing shoulder 24 and by a snap ring (not shown) held by snap ring groove 26. Right countershaft trapdoor bearing 48 is held in position within recess 36 by bearing shoulder 38 and by a snap ring (not shown) held by snap ring groove 40. Right mainshaft trapdoor bearing 46 is held in position within recess 30 by bearing shoulder 32 and by a snap ring (not shown) held by snap ring groove 34.

The distance from the outside of bearing shoulder 24 (i.e. the inside of left mainshaft case bearing 42) to the outside of bearing shoulder 32 (i.e. the inside of right mainshaft trapdoor bearing 46) is 5.97 inches. This distance is characteristic of Big Twin five speed transmissions. Any mainshaft that is to be used in one of these transmission cases without need to modify the transmission case or the trapdoor, must have bearing surfaces that register with left mainshaft case bearing 42 and right mainshaft trapdoor bearing 46 that are separated by 5.97 inches. The same is true of any countershaft that is to be used in one of these transmission cases without need to modify the transmission case or the trapdoor, in that such a countershaft must have bearing surfaces that register with a left countershaft case bearing 44 and a right countershaft trapdoor bearing 48 that are separated by 6.10 inches (as measured from the inside of left countershaft case bearing 44 to the inside of right countershaft trapdoor bearing 48).

Referring now again to FIG. 1A, when assembled, five speed gear set 60 is located inside housing 12, with trapdoor 18 fastened to the right side of housing 12, with shifting assembly 94 fastened to the top of hosing 12, and the appropriate covers (for example, transmission top cover and transmission end cover) and other components in place.

There are few modern motorcycles that have transmission cases separate from the engine case. BMW motorcycles, for example, have transmission cases that are bolted to the engine case, but that can be unbolted during service. Historically, more motorcycles had separate engine and transmission cases. The modern trend, for motorcycles other than Big Twins, seems to be toward unitary engine and transmission cases.

Motorcycle transmission cases, in general, are designed to be as small as possible because of weight and size considerations. This is especially true when the transmission case is separate and therefore already heavier than if it were combined with the engine case. Thus, the cavity inside the transmission case is generally small.

Another reason why the transmissions for Harley-Davidson® Big Twin motorcycles is unique is that the large amount of torque generated by the engines available on those motorcycles has, historically, lead to little attention being given to optimizing the gearing. Harley-Davidson made some improvements, for example, by introducing 4 speed transmissions in the 1930's and then introducing 5 speed transmissions in the 1980's. Adding additional gears allows one to take better advantage of narrower power bands. However, because Harley-Davidson® Big Twin motorcycles have so much torque and such a wide power band, adding additional gears has not been a high priority. In racing motorcycles, adding additional gears to take better advantage of the narrower power bands on racing-tuned engines is common, but that is not the case on Big Twins.

On Big Twins, the more prevalent concern is to lower the engine r.p.m. at cruising speed. Often, this is done by replacing the stock rear pulley with a smaller one. This has the effect of increasing the motorcycle speed for any given engine r.p.m., or conversely, to reduce the engine r.p.m. for any given speed. Although reducing the size of the rear pulley lowers cruising r.p.m. (or, conversely, increases cruising speed), it effects performance at all the gears.

Custom, replacement gear sets are also available that modify some of the stock gear ratios. For example, the assignee of this patent, Custom Chrome, offers its RevTech® gear sets for 5 speed Big Twin transmissions in either the stock 3.24:1 or close-ratio 2.94:1 first gears. However, because of size limitations of the transmission case cavity, the changes that have been possible through replacement gear sets have been minor.

Complete custom transmissions (often larger than stock) are also available if more significant modifications are required than are permitted by the size limitations of the transmission case cavity. However, replacing a transmission case can take in excess of 8 hours if performed by a trained mechanic. If a less-trained, weekend motorcycle-enthusiast would undertake such a task, it could probably mean having a dismantled motorcycle in the garage or shop for several days.

Thus, the need exists for a method or apparatus for providing low cruising r.p.m. for Big Twin motorcycles without affecting the other transmission characteristics.

The need also exists for increasing top-end speed of Big Twin motorcycles without affecting the other transmission characteristics.

The need also exists for gear configurations that allow a more compact arrangement of gears inside a Big Twin transmission.

The need also exists for a gear set that is stronger and with a longer life.

The need also exists for Big Twin transmissions in which the shift pawl can be adjusted when the gears are in more than one configuration (i.e. other than in third gear).

The need also exists for Big Twin transmissions that provide smoother, more uniform shifting, with the same lever throw in every gear.

The need also exists for a method and apparatus for fulfilling the above needs that is not detectable from a visual inspection of the assembled motorcycle.

The need also exists for a method and apparatus for fulfilling the above needs with a minimum amount of work and expense on the part of the motorcycle owner or mechanic.

SUMMARY OF THE INVENTION

It is the general objective of the invention to provide a method and apparatus for providing low cruising r.p.m. for Big Twin motorcycles without affecting the other transmission characteristics.

It is another objective of the invention to provide a method and apparatus for increasing the speed of Big Twin motorcycles in top gear while keeping the engine r.p.m. in the optimum operating range.

It is yet another objective of the invention to provide gear configurations that allow a more compact arrangement of gears inside a Big Twin transmission.

It is another objective of the invention to provide a gear set that is stronger and with a longer life.

Another objective of the invention is to provide Big Twin transmissions in which the shift pawl can be adjusted when the gears are in more than one configuration (i.e. other than in third gear).

Yet another objective of the invention is to provide a Big Twin transmission with smoother, more uniform shifting, with the same lever throw in every gear.

Yet another objective of the invention is to provide a method and apparatus for fulfilling the above objectives in a manner that is not detectable from a visual inspection of the assembled motorcycle.

Another objective of the invention is to provide a method and apparatus for fulfilling the above objectives with a minimum amount of work and expense on the part of the motorcycle owner or mechanic.

The above as well as additional objectives are achieved as is now described. A six speed gear assembly is provided having a mainshaft, countershaft, mainshaft 1st–6th gears, countershaft 1st–6th gears, and 4th/6th gear shift member. A shifting assembly is also provided with a shifter cam having uniformly distributed and uniformly shaped detents that are engaged by the shift cam follower. The six speed gear assembly has modes of operation corresponding to six speeds (1st through 6th) and a neutral position. The sixth speed is an overdrive speed (the output from the transmission turns faster than the input to the transmission), while the first through fifth speeds correspond to conventional gear ratios.

The six speed gear assembly and the shifting assembly fit within the original equipment Harley-Davidson® Big Twin five speed transmission without the need to modify the transmission case. This allows the conversion of a Big Twin five speed transmission into a six speed transmission without removal or replacement of the transmission case and by replacing a minimal number of components.

The above as well as additional objectives, features, and advantages will become apparent in the following description.

BRIEF DESCRIPTION OF THE DRAWINGS

FIGS. 5A–5C are views of the mainshaft first gear of the present invention.

FIG. 6C is a view of the cylindrical surface of the shift cam of the present invention.

FIGS. 7A–7G are views of the six speed gear assembly of the present invention showing the movement of the various members to achieve each of the speed selections.

DETAILED DESCRIPTION OF THE PREFERRED EMBODIMENT

Figure 1A:
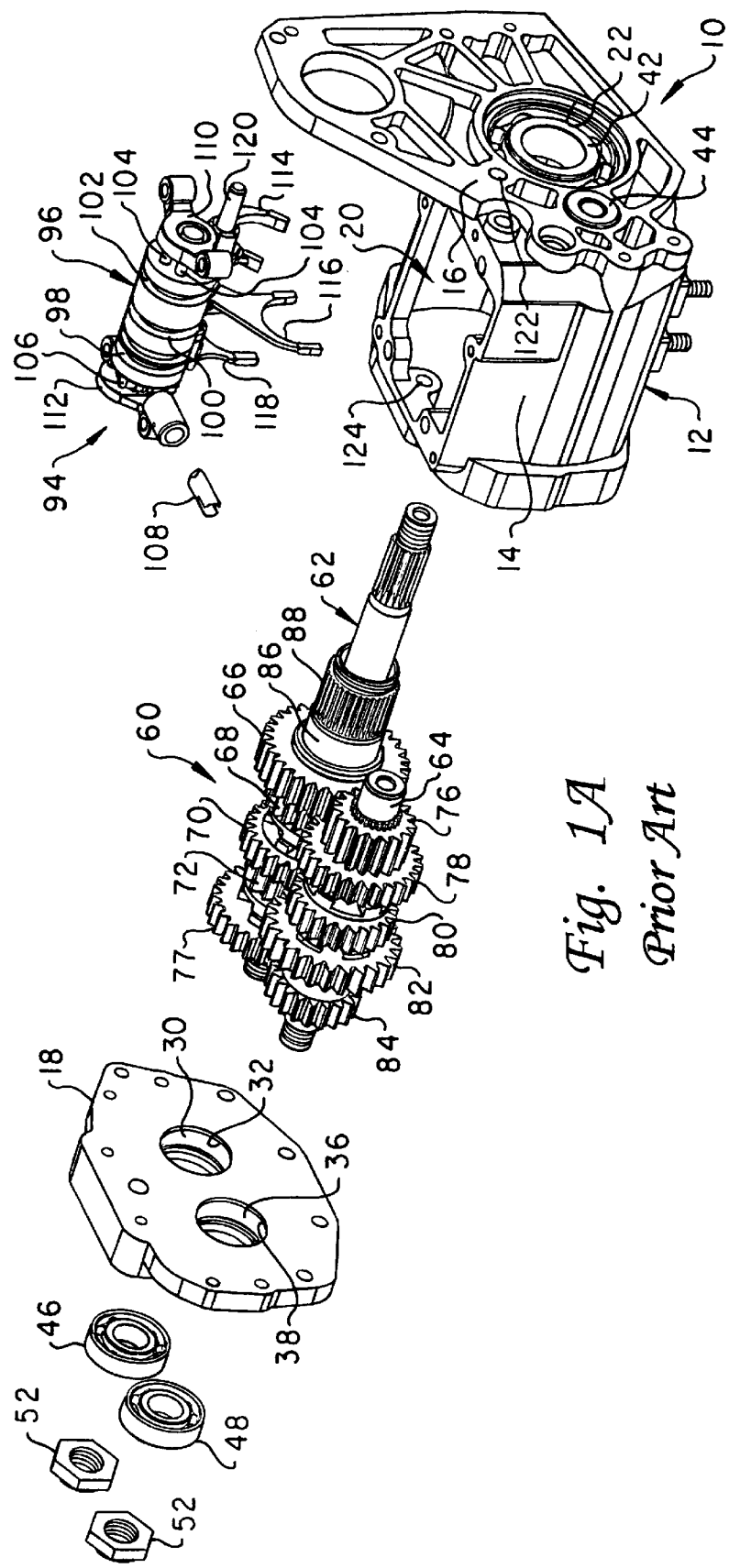
FIG. 1A is a exploded view of the major components of a prior-art Harley-Davidson® Big Twin five speed transmission.
Figure 2:
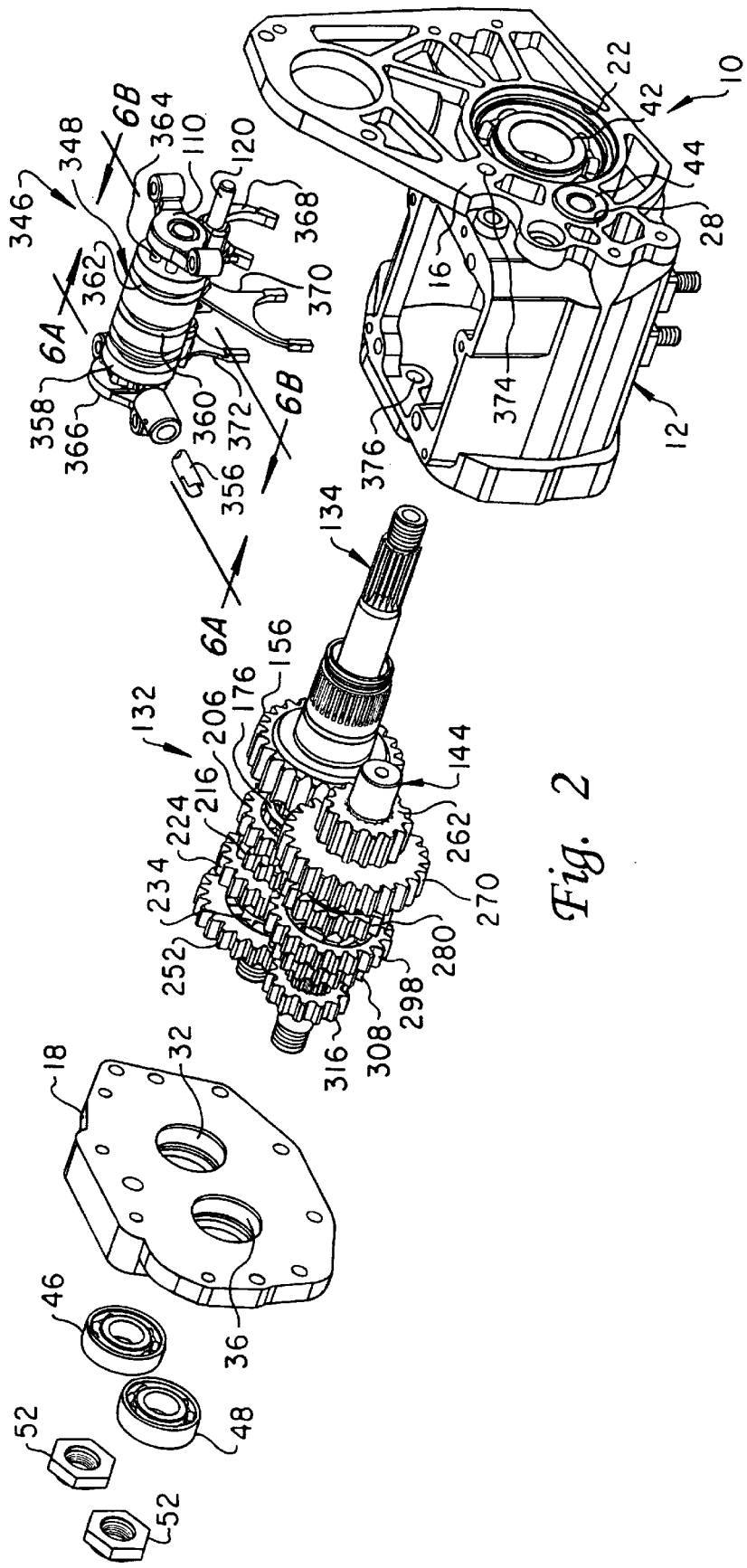
FIG. 2 is an exploded view of a Big Twin transmission case and the six speed gear and shifting assemblies of the present invention.

FIG. 2 shows a partially exploded view of the gear assembly and other components of the present invention and how those components can be used to convert the five speed transmission of FIG. 1A into a six speed transmission.

Referring next to FIG. 2, the six speed gear and shifting assemblies of the present invention are shown in a partially exploded view together with a five speed transmission case. The transmission case 10 of FIG. 2 is the same as transmission case 10 of FIG. 1A (including housing 12, left side wall 16, and trapdoor 18), and so are the: bearings 42, 44, 46, and 48; recesses 22, 28, 32, 36; hex nuts 52; left shift cam support tower 110; and shift fork shaft 120.

Figure 3:
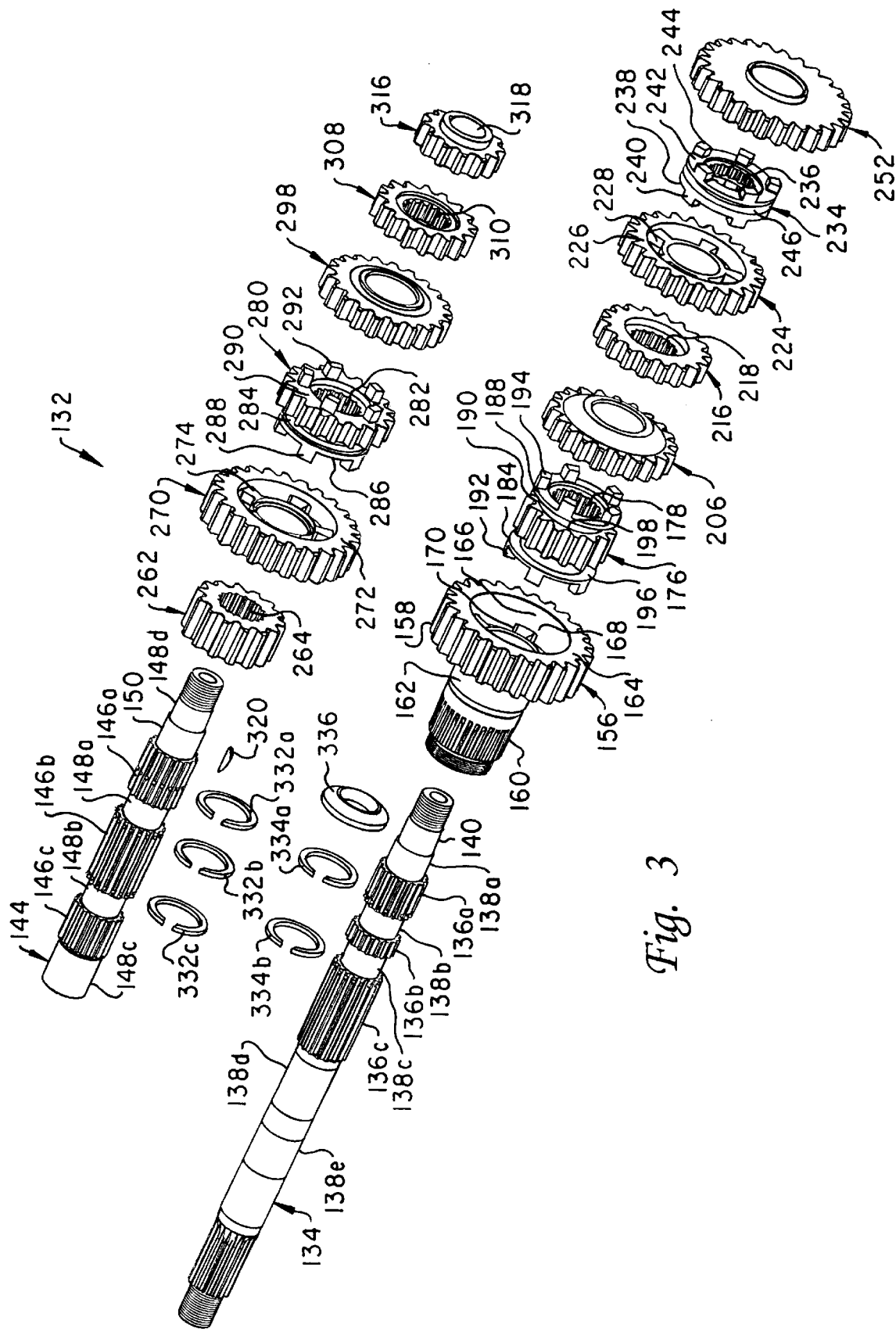
FIG. 3 is an exploded view of the six speed gear assembly of the present invention.

Looking first at the six speed gear set (or assembly) 132, FIG. 3 is an exploded view of that gear set 132. Referring primarily to FIGS. 2 and 3, six speed gear set 132 comprises mainshaft (or driveshaft) 134, countershaft 144, mainshaft 5th gear (also referred to as driveshaft drive gear or driveshaft output gear) 156, mainshaft 1st gear 176, mainshaft 3rd gear 206, mainshaft 2nd gear 216, mainshaft 4th gear 224, 4th/6th gear shift member 234, mainshaft 6th gear (or mainshaft overdrive gear) 252, countershaft 5th gear 262, countershaft 1st gear 270, countershaft 3rd gear 280, countershaft 2nd gear 298, countershaft 4th gear 308, and countershaft 6th gear (or countershaft overdrive gear) 316. Six speed gear set 132 also includes the necessary split case bearings, retaining rings, thrust washers, and spacers, although, for clarity, not all these components are shown.

Figure 4:
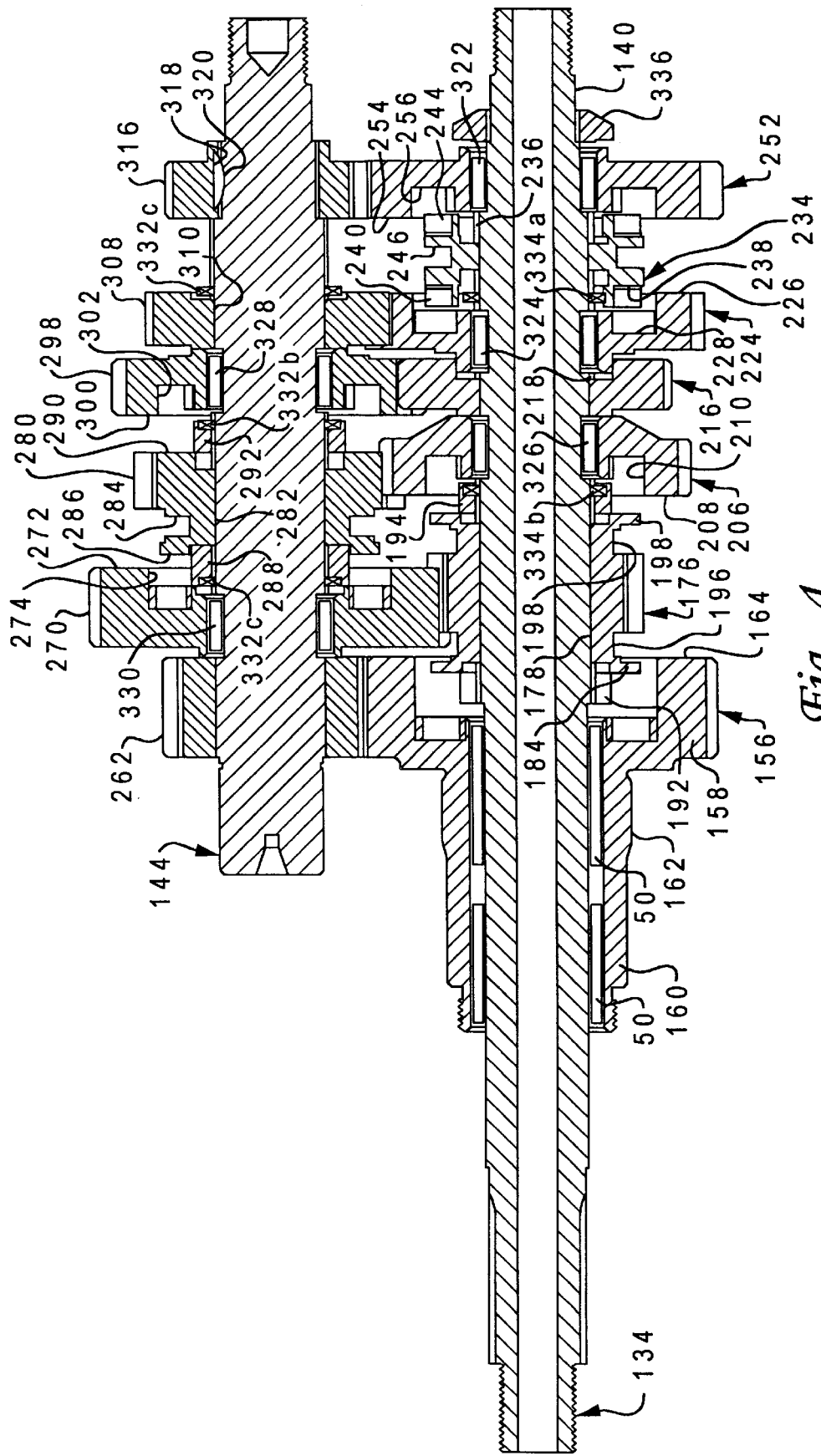
FIG. 4 is a cross sectional view of the six speed gear assembly of the present invention.

FIG. 4 shows a cross section of six speed gear set 132. Referring now primarily to FIGS. 3 and 4, mainshaft 134 has splined regions 136a, 136b, and 136c, and bearing regions 138a, 138b, 138c, 138d, and 138e. The gears and shift member and their arrangement on mainshaft 134 is further described below.

Mainshaft 6th gear 252 is freely rotatably supported by split case bearing 322 on bearing region 138a of mainshaft 134. Mainshaft 6th gear 252 has a diametral pitch of 8, 26 teeth, and a face width of 0.531 inches. On the left side 254 of mainshaft 6th gear 252 are dog recesses 256 to receive right dogs 244 (discussed below) of 4th/6th gear shift member 234.

An alternative design for mainshaft 6th gear 176 has 27 teeth with a diametral pitch of 8.

4th/6th gear shift member 234 is rotatably coupled to, and axially movable with respect to, mainshaft 134 by splined region 136a on mainshaft 134 and splines 236 on 4th/6th gear shift member 234. 4th/6th gear shift member 234 is retained, in part, by retaining ring 334a. 4th/6th gear shift member 234 has a left side 238 with left dogs 240 protruding therefrom and a right side 242 with right dogs 244 protruding therefrom. Fork groove 246 is located between left side 238 and right side 242 of 4th/6th gear shift member 234.

Mainshaft 4th gear 224 is freely rotatably supported by split case bearing 324 on bearing region 138b of mainshaft 134. Mainshaft 4th gear 224 has a diametral pitch of 8, 23 teeth, and a face width of 0.531 inches. On the right side 226 of mainshaft 4th gear 224 are dog recesses 228 to receive left dogs 240 of 4th/6th gear shift member 234.

Mainshaft 2nd gear 216 is rotatably coupled to mainshaft 134 by splined region 136b on mainshaft 134 and splines 218 on mainshaft 2nd gear 216. Mainshaft 2nd gear 216 has a diametral pitch of 8, 18 teeth, and a face width of 0.531 inches.

Mainshaft 3rd gear 206 is freely rotatably supported by split case bearing 326 on bearing region 138c of mainshaft 134. Mainshaft 3rd gear 206 has a diametral pitch of 8, 21 teeth, and a face width of 0.531 inches. On the left side 208 of mainshaft 3rd gear 206 are dog recesses 210 to receive right dogs 194 (discussed below) of mainshaft 1st gear 176.

Mainshaft 1st gear 176 is rotatably coupled to, and axially movable with respect to, mainshaft 134 by splined region 136c on mainshaft 134 and splines 178 on mainshaft 1st gear 176. Mainshaft 1st gear 176 is retained, in part, by retaining ring 334b.

Referring now to primarily to FIGS. 3, 4, and 5A–5C, mainshaft 1st gear 176 has a central portion 180, a left end portion 182 with a left flange 184 extending radially therefrom, and a right end portion 186 with a right flange 188 extending radially therefrom. About the circumference of mainshaft 1st gear 176 are 14 teeth 190 with a diametral pitch of 7.8154 and a face width of 0.750 inches. Protruding from the left flange 184 are left dogs 192 which extend longitudinally from the left flange and away from central portion 180. Protruding from the right flange 188 are right dogs 194 which extend longitudinally from the right flange and away from central portion 180. Because of the manner in which FIG. 4 has been sectioned, dogs 192 and 194 are not cut by the cross section and appear behind the plane of the drawing and, because of their position, appear closer to mainshaft 134. A left annular groove 196 is defined between left flange 184 and gear teeth 190. A right annular groove (or fork groove) 198 is defined between right flange 188 and gear teeth 190. Annular grooves 196 and 198 extend to the same depth as the root of teeth 190. Annular grooves 196 and 198 allow mainshaft 1st gear 176 to move axially along mainshaft 134 without interfering with countershaft 1st gear 270.

An alternative design for mainshaft 1st gear 176 has 15 teeth with a diametral pitch of 8.466.

Referring now primarily to FIG. 3 and 4, mainshaft 5th gear 156 (also referred to as driveshaft drive gear or mainshaft drive gear) comprises a gear portion 158 rigidly connected to an output sprocket mounting member 160. Gear portion 158 has 25 teeth with a diametral pitch of 8 and a face width of 0.857 inches. Mainshaft 5th gear 156 is freely rotatably supported by left mainshaft case bearing 42 which supports the outside bearing surface 162 of mainshaft 5th gear 156. Mainshaft 5th gear bearings 50 are located between the inside of mainshaft 5th gear 156 and mainshaft 134 at bearing surfaces 138d and 138e, and keep mainshaft 134 concentric with mainshaft 5th gear 156.

On the right side 164 of mainshaft 5th gear 156 there is a gear recess 166 of diameter larger than the greatest addendum diameter of mainshaft 1st gear 176. Gear recess 166 is designed to receive the left flange 184, left annular groove 196, and a portion of teeth 190 of mainshaft 1st gear 176. Gear recess 166, which allows part of mainshaft 1st gear 176 (including a portion of teeth 190) to fit inside mainshaft 5th gear 156 greatly reduces the axial space requirement of six speed gear set 132. At the left end 168 of gear recess 136 are dog recesses 170.

Referring still primarily to FIGS. 3 and 4, countershaft 144 has splined regions 146a, 146b, and 146c, bearing regions 148a, 148b, 148c, and press-fit region 150.

Countershaft 6th gear 316 is rotatably coupled to countershaft 144 by the press-fit connection between press-fit region 150 of countershaft 144, the inside surface 318 of countershaft 6th gear 316, and key 320. Countershaft 6th gear 316 has a diametral pitch of 8, 13 teeth, and a face width of 0.531 inches.

An alternative design for countershaft 6th gear 176 has 13 teeth with a diametral pitch of 8.

Countershaft 4th gear 308 is rotatably coupled to countershaft 144 by splined region 146a on countershaft 144 and splines 310 on countershaft 4th gear 308. Retaining ring 332a prevents countershaft 4th gear 308 from moving axially to the right of splined region 146a. Countershaft 4th gear 308 has a diametral pitch of 8, 16 teeth, and a face width of 0.531 inches.

Countershaft 2nd gear 298 is freely rotatably supported by split case bearing 328 on bearing region 148a of countershaft 144. Countershaft 2nd gear 298 has a diametral pitch of 8, 21 teeth, and a face width of 0.531 inches. On the left side 300 of countershaft 2nd gear 298 are dog recesses 302 to receive right dogs 292 (discussed below) of countershaft 3rd gear 280.

Countershaft 3rd gear 280 is rotatably coupled to, and axially movable with respect to, countershaft 144 by splined region 146b on countershaft 144 and splines 282 on countershaft 3rd gear 280. Countershaft 3rd gear 280 is retained, in part, by retaining rings 332b and 332c. Countershaft 3rd gear 280 has a diametral pitch of 8, 18 teeth, and a face width of 0.531 inches. Countershaft 3rd gear 280 has a right side 290 with right dogs 292 protruding therefrom, a fork groove 284 to the left of the teeth, and a left side 286 with left dogs 288 protruding therefrom. Because of the manner in which FIG. 4 has been sectioned, dogs 288 and 292 are not cut by the cross section and appear behind the plane of the drawing and, because of their position, appear closer to countershaft 144.

Countershaft 1st gear 270 is freely rotatably supported by split case bearing 330 on bearing region 148b of countershaft 144. Countershaft 1st gear 270 has a diametral pitch of 7.8154, 23 teeth, and a face width of 0.670 inches. On the right side 272 of countershaft 1st gear 270 are dog recesses 274 to receive left dogs 288 of countershaft 3rd gear 280.

An alternative design for countershaft 1st gear 176 has 27 teeth with a diametral pitch of 8.466.

Countershaft 5th gear 262 is rotatably coupled to countershaft 144 by splined region 146c on countershaft 144 and splines 264 on countershaft 5th gear 262. Countershaft 5th gear 262 has a diametral pitch of 8, 14 teeth, and a face width of 0.937 inches.

Six speed gear set 132 is dimensioned such that it fits into transmission case 10 (housing 10 and trapdoor 18) without any modification to the five speed transmission case. This is achieved by particular arrangement, shape, and configuration of gears described above, which allows mainshaft 134 to have a bearing region 140 which supports a right mainshaft trapdoor bearing 46 such that the distance between the inside of mainshaft trapdoor bearing 46 is a distance of 5.97 inches from the inside of left mainshaft case bearing 42, which is the same as on a Big Twin five speed transmission. Similarly, the above-described configuration of gears allows the countershaft 144 to have a bearing region 148c which supports a right countershaft trapdoor bearing 48 and a bearing region 148d such that the distance between the inside of countershaft trapdoor bearing 48 and the inside of left countershaft case bearing 44 is also the same as that same distance on a Big Twin five speed transmission. This allows six speed gear set 132 to be installed into a transmission case 10 without any modifications to transmission case 10. Not modifying the transmission case 10 makes the presence of six speed gear set 132 virtually undetectable from a visual inspection of the assembled motorcycle.

Figure 1B:
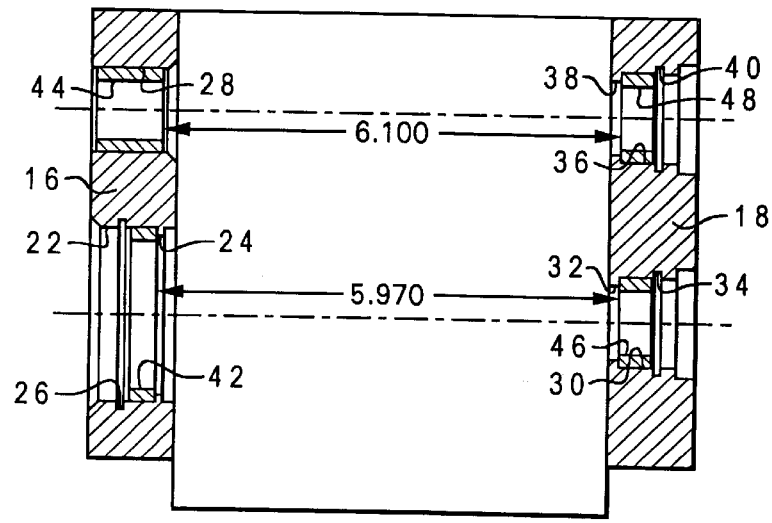
FIG. 1B is a schematic horizontal cross section of the prior-art transmission case of FIG. 1A, and additionally showing the case and trapdoor bearings.

Looking next to the shifting assembly 346 by referring primarily to FIGS. 1 and 2 shifter cam 348, shifter forks 368, 370, and 372, right shift cam support tower 366, and shift cam follower 356 have been modified from their corresponding components of FIG. 1A, and are discussed in further detail below. The remainder of the parts for the shifting assembly 346, such as shift fork shaft 120 and left shift cam support tower 110, are the same as the similarly numbered parts of FIG. 1A.

Shifter cam 348 is supported by left and right shift cam support towers 110 and 366. The shift grooves 358, 360, and 362 are shown in FIG. 2, but, for convenience, have not been accurately depicted in that figure and will be more accurately described further below. Left and right shift cam support towers 110 and 366 are connected to the top of housing 12. Shifter forks 368, 370, and 372 are supported by shift fork shaft 120, which is in turn supported by shift fork shaft support holes 374 and 376.

One end of the 3rd/5th gear shifter fork 368 (FIG. 2) engages the 3rd/5th gear shift groove 358 (FIG. 6C), and the other end engages fork groove 198 (FIG. 3) on mainshaft 1st gear 176. One end of the 1st/2nd gear shifter fork 370 engages the 1st/2nd gear shift groove 360 and the other end engages fork groove 284 on countershaft 3rd gear 280. One end of 4th/6th gear shifter fork 372 engages the 4th/6th gear shift groove 362 and the other end engages fork groove 246 on the 4th/6th gear shift member 234.

In operation, when the shifter shaft (not shown) rotates in response to the rider operating the shift lever (not shown), the shifter pawl (not shown) acts against the shift pins 364 causing shifter cam 348 to rotate. The rotation of shifter cam 348 causes one or more of shifter forks 368, 370, 372 to move axially along shift fork shaft 120, in turn causing the appropriate gear members to move axially along either mainshaft 134 or countershaft 144, causing a change in the gear ratio. The details of shifter assembly 346 are addressed in more detail below.

Figure 7A:
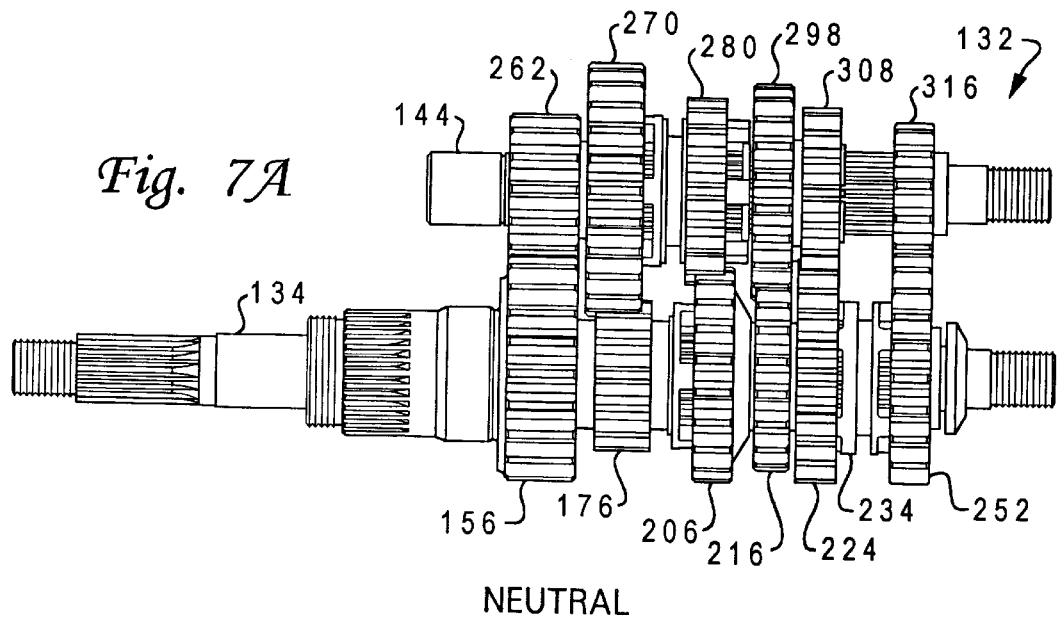

Referring now primarily to FIGS. 7A–7G, these Figures show the necessary axial movements of mainshaft 1st gear 176, countershaft 3rd gear 280, and 4th/6th gear shift member 234 to achieve the available gear ratios of the six speed gear set 132. FIG. 7A shows six speed gear set 132 in the neutral position. Namely, none of the dogs of mainshaft 1st gear 176, countershaft 3rd gear 280, or 4th/6th gear shift member 234 are engaging the dog recesses of adjacent gears. Thus, each splined gear is meshing with a freely rotating gear, thereby transmitting no torque.

Figure 7B:
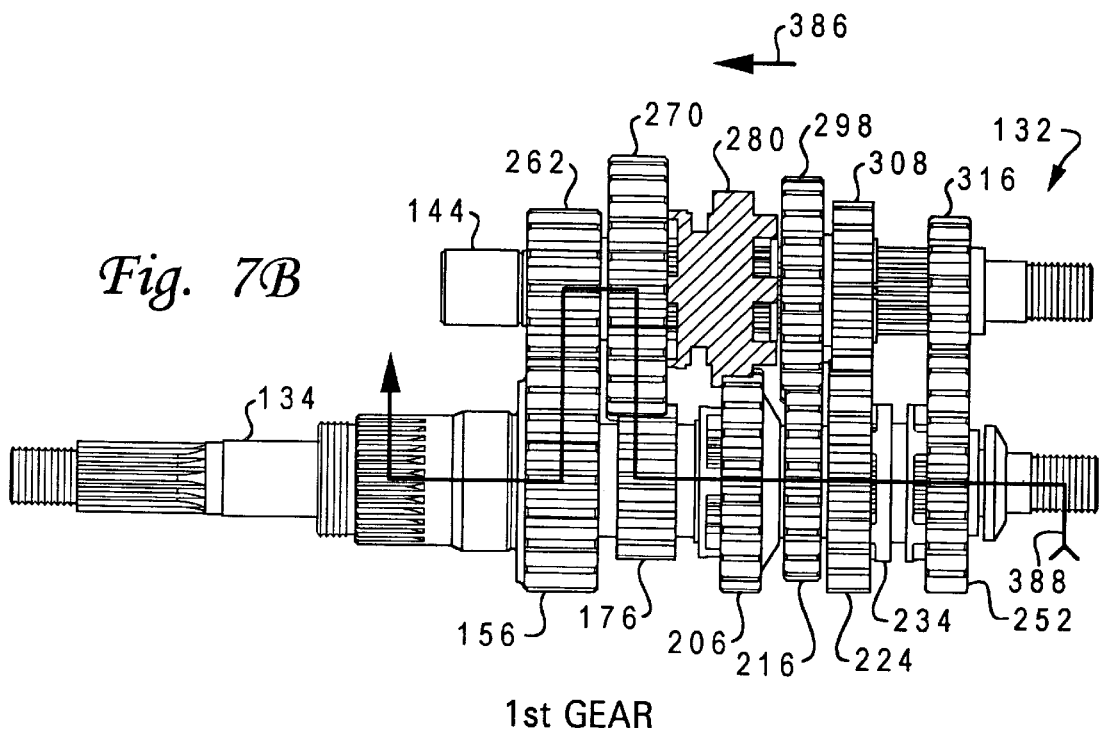

Referring to FIG. 7B, to shift the six speed gear set 132 into 1st gear, countershaft 3rd gear 280 is moved to the left as shown by arrow 386, where left dogs 288 of countershaft 3rd gear 280 will engage the dog recesses 274 of countershaft 1st gear 270. This rotatably couples countershaft 1st gear 270 to the countershaft 144, thus allowing torque to flow as shown by the arrow 388. When six speed gear set 132 is in first gear, it undergoes higher stress than in any other gear. That is why gears 176, 270, 262, and 156 have a wider face width. By placing mainshaft 5th gear 156 and mainshaft 1st gear 176 close to each other and countershaft 5th gear 262 and countershaft 1st gear 270 close to each other, the torque path along countershaft 144 is reduced, thereby resulting in a stronger 1st gear arrangement.

Figure 7C:
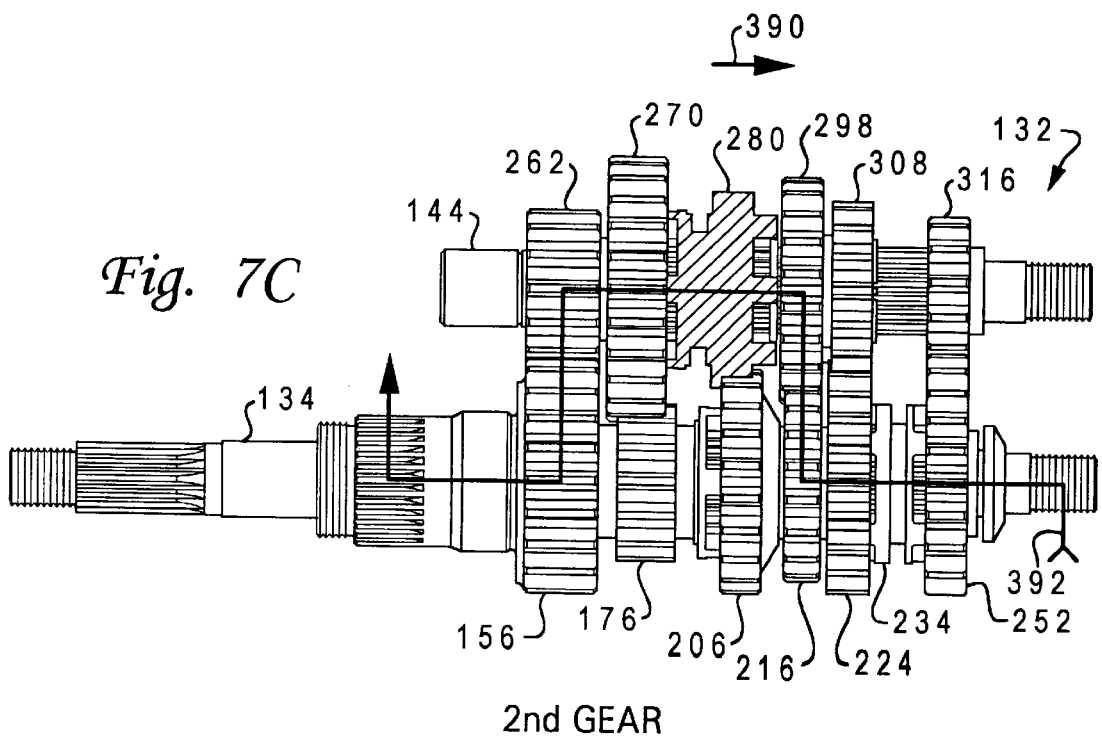

FIG. 7C shows that to shift the six speed gear set 132 into 2nd gear, countershaft 3rd gear 280 is moved to the right as shown by arrow 390, where right dogs 292 of countershaft 3rd gear 280 will engage the dog recesses 302 of countershaft 2nd gear 298. This rotatably couples countershaft 2nd gear 298 to the countershaft 144, thus allowing torque to flow as shown by the arrow 392.

Figure 7D:
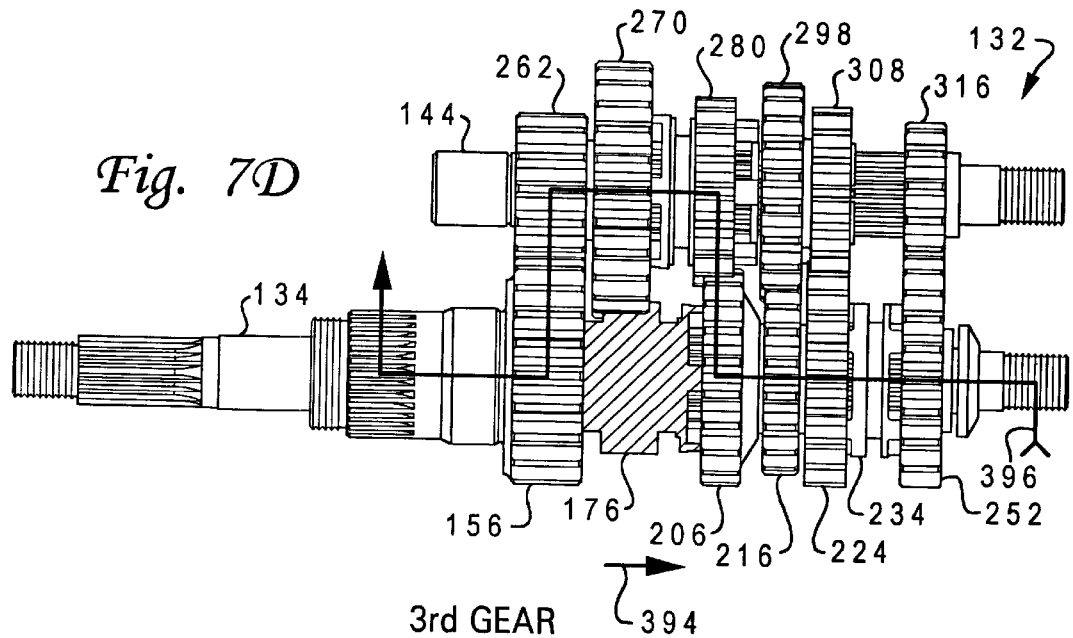

FIG. 7D shows that to shift the six speed gear set 132 into 3rd gear, mainshaft 1st gear 176 is moved to the right as shown by arrow 394, where right dogs 194 of mainshaft 1st gear 176 will engage the dog recesses 210 of mainshaft 3rd gear 206. This rotatably couples mainshaft 3rd gear 206 to the mainshaft 134, thus allowing torque to flow as shown by the arrow 396.

Figure 7E:
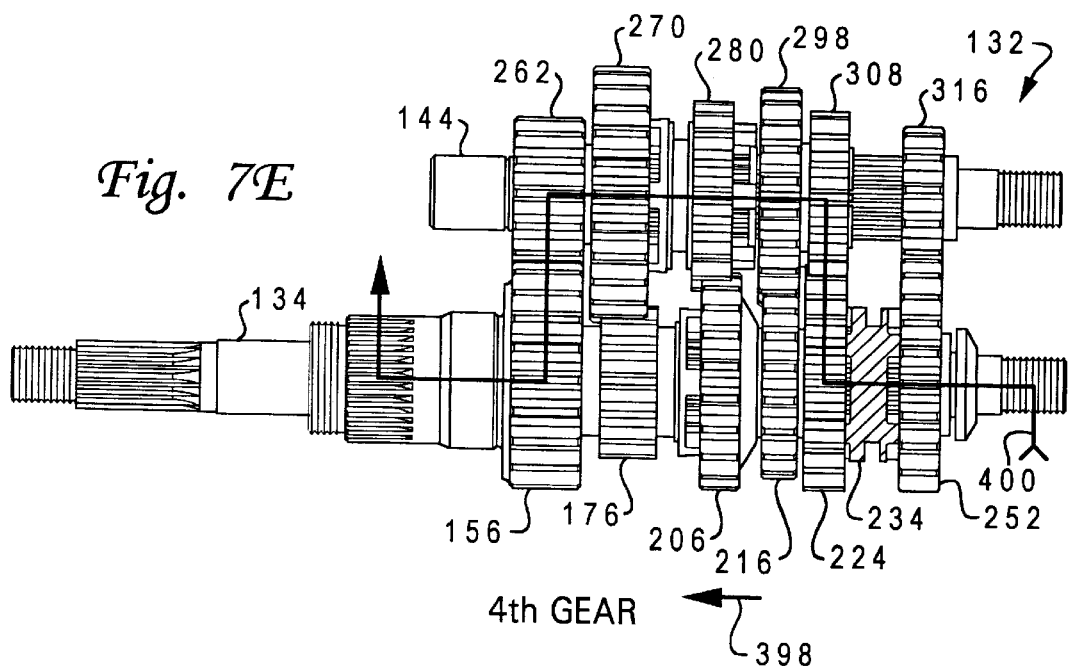

FIG. 7E shows that to shift the six speed gear set 132 into 4th gear, 4th/6th gear shift member 234 is moved to the left as shown by arrow 398, where left dogs 240 of 4th/6th gear shift member 234 will engage the dog recesses 228 of mainshaft 4th gear 224. This rotatably couples mainshaft 4th gear 224 to the mainshaft 134, thus allowing torque to flow as shown by the arrow 400.

FIG. 7F shows that to shift the six speed gear set 132 into 5th gear, mainshaft 1st gear 176 is moved to the left as shown by arrow 402, where left dogs 192 of mainshaft 1st gear 176 will engage the dog recesses 170 of mainshaft 5th gear 156. This rotatably couples mainshaft 5th gear 156 to the mainshaft 134, thus allowing torque to flow as shown by the arrow 404.

FIG. 7G shows that to shift the six speed gear set 132 into 6th gear, 4th/6th gear shift member 234 is moved to the right as shown by arrow 406, where right dogs 244 of 4th/6th gear shift member 234 will engage the dog recesses 256 of mainshaft 6th gear 252. This rotatably couples mainshaft 6th gear 252 to the mainshaft 134, thus allowing torque to flow as shown by the arrow 408. Mainshaft 6th gear 252 and countershaft 6th gear 316 are located at opposite sides of transmission case 10. This results in the sixth gear position to have the longest torque path along countershaft 144. Because the least amount of torque is transmitted in sixth gear, this allows shorter torque paths along countershaft 144 for the gear positions that result in higher torque.

Six speed gear set 132, described above, results in the following gear ratios:

| Gear | Input:Output Ratio |
| --- | --- |
| 1st gear | 2.94:1 |
| 1st gear (alt.) | 3.21:1 |
| 2nd gear | 2.082:1 |
| 3rd gear | 1.531:1 |
| 4th gear | 1.242:1 |
| 5th gear | 1.00:1 |
| 6th gear | 0.893:1 |
| 6th gear (alt.) | 0.860:1 |

The above gear ratios are measured with the input being the rotation of mainshaft 134 and the output being the rotation of mainshaft 5th gear 156.

Figure 6B:
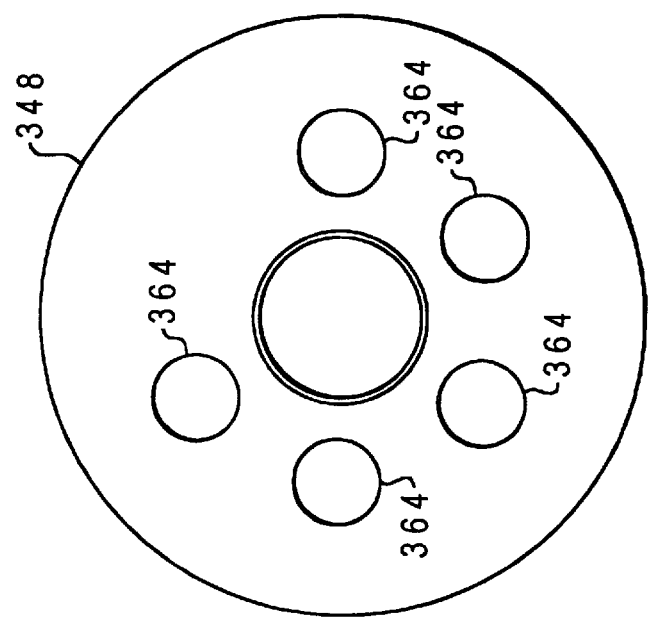
FIGS. 6A–6B are views of the shift cam of the present invention taken along lines 6A—6A and 6B—6B, respectively, in FIG. 2.
Figure 6A:
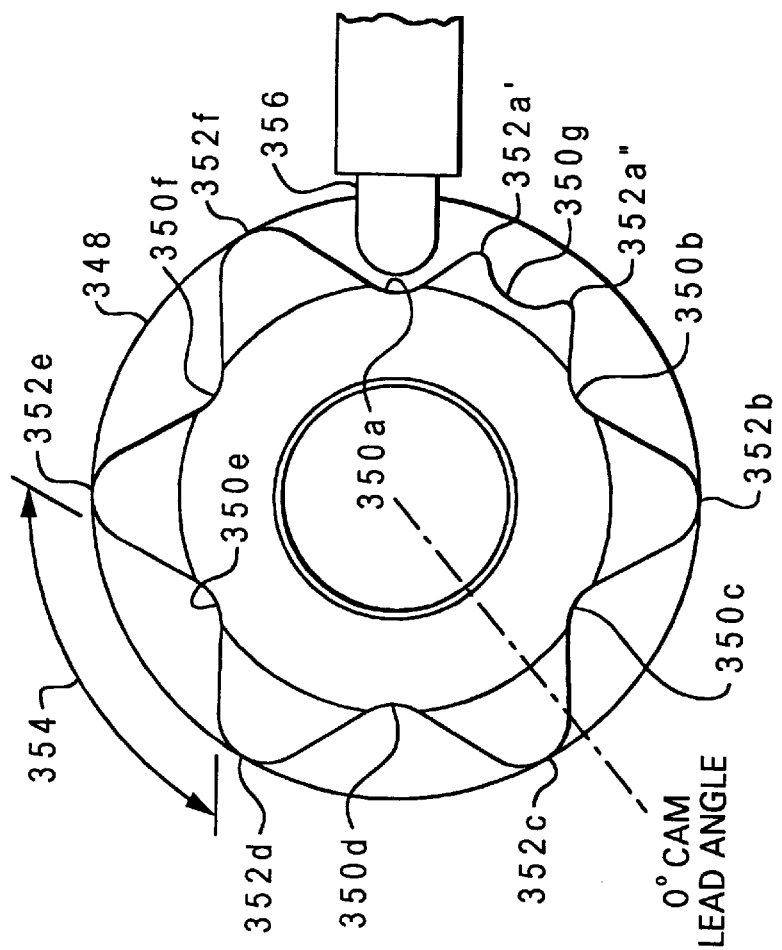

Referring now to FIGS. 6A–6C, the details of shifter cam 348 are seen in more detail. FIG. 6A shows a view of shifter cam 348 taken along line 6A—6A of FIG. 2A. FIG. 6B shows a view of shifter cam 348 taken along line 6B—6B of FIG. 2A and showing the arrangement of pins 364. FIG. 6C is a flattened depiction of the cylindrical surface of shifter cam 348, including the shift grooves 358, 360, and 362. The line labeled "1st" in FIG. 6C matches with the zero degree cam lead angle of FIG. 6A, and the remainder of FIG. 6C "wraps" clockwise around shifter cam 348. Valleys 350a–350g, in conjunction with shift cam follower 356 bias shifter cam 348 to one of seven predetermined positions.

When shift cam follower 356 is at valley 350g, shift forks 386, 370, and 372 are along line "N" of FIG. 6C, and mainshaft 1st gear 176, countershaft 3rd gear 280, and 4th/6th gear shift member 234 are not engaging any adjacent gears, thus causing six speed gear set 132 to be in the configuration of FIG. 7A—the neutral position.

When shift cam follower 356 is at valley 350a, shift forks 368, 370, and 372 are along line "1st" of FIG. 6C, and 1st/2nd gear shift groove 360 will cause 1st/2nd gear shifter fork 370 to move countershaft 3rd gear 280 to the left, thus causing six speed gear set 132 to be in the configuration of FIG. 7B—first gear.

When shift cam follower 356 is at valley 350b, shift forks 368, 370, and 372 are along line "2nd" of FIG. 6C, and 1st/2nd gear shift groove 360 will cause 1st/2nd gear shifter fork 370 to move countershaft 3rd gear 280 to the right, thus causing six speed gear set 132 to be in the configuration of FIG. 7C—second gear.

Similarly, when cam follower 356 is at valleys 350c, 350d, 350e, and 350f, shift forks 368, 370, and 372 will be along lines "3rd", "4th", "5th", and "6th", respectively, thus causing the appropriate movement of mainshaft 1st gear 176, countershaft 3rd gear 280, and/or 4th/6th gear shift member 234 to place six speed gear set 132 into third, fourth, fifth, and sixth speeds, respectively.

Referring now particularly to FIG. 6A, the particular spacing and shape of the peaks and valleys of the cam surface followed by the shift cam follower 356 is shown. Valleys 350a–350f are evenly spaced at 60° apart from each other. Also, each valley 350a–350f has a radius of 0.125 inches, each peak 352b–352f has a radius of 0.25 inches, and the ramps leading from each valley to the two adjacent peaks form an angle of 120° (for example see the angle labeled 354). Peaks 352a′ and 352a″ and valley 350g are the exception in that valley 350g corresponds to the neutral position and was placed between otherwise equally spaced-apart valleys. The uniformity in the spacing and shape of the valleys 350a–350f and peaks 352b–352f, and the particular angle of the ramps between valleys 350a–350f and peaks 352b–352f results in smoother, more uniform shifting with a shift lever throw that is the same in every gear. Also, it allows the shift pawl to be adjusted when the gears are in any one of several configurations (e.g. 2nd gear, 3rd gear, 4th gear, and 5th gear).

To convert a Big Twin five speed transmission into a six speed transmission using the present invention, the only parts of the five speed transmission that need to be replaced are mainshaft 62, countershaft 64, mainshaft 5th gear 66, mainshaft 2nd gear 68, mainshaft 3rd gear 70, mainshaft 1st gear 72, mainshaft 4th gear 74, countershaft 5th gear 76, countershaft 2nd gear 78, countershaft 3rd gear 80, countershaft 1st gear 82, countershaft 4th gear 84, shifter cam 96, right shift cam support tower 112, shift cam follower 108, shift fork 114, shift fork 116, shift fork 118, and the split case bearings, retaining rings, thrust washers, and spacers.

While the invention has been particularly shown and described with reference to a preferred embodiment, it will be understood by those skilled in the art that various changes in form and detail may be made therein without departing from the spirit and scope of the invention.

What is claimed is:

1. A method of converting a five speed motorcycle transmission of the type having an original transmission housing with left and right side walls, an original driveshaft supported at the right and left side walls by bearings at opposite ends of the original driveshaft, the bearings being separated by a bearing-to-bearing distance, the original driveshaft having an end portion extending outwardly from the original transmission housing beyond the left side wall, the end portion being rotatably coupled to an output from a motorcycle engine, an original countershaft mounted in the original transmission housing in horizontally spaced parallel relationship to the original driveshaft and with a right end rotatably mounted to the right side wall and a left end rotatably mounted to the left side wall, an output sprocket mounting member concentrically disposed about the driveshaft end portion located outside the original transmission housing, the output sprocket mounting member being rigidly connected to a gear inside the original transmission housing, five original driveshaft gears disposed about the original driveshaft and five original gears disposed about the original countershaft, the original driveshaft gears and the original countershaft gears being selectively positionable to selectively provide any one of five drive ratios and an idle ratio, into a six speed transmission, the method comprising the steps of:

leaving the original transmission housing mounted on a motorcycle;

opening the original transmission housing;

removing the original driveshaft, original countershaft, original five driveshaft gears, and original five countershaft gears from the original transmission housing;

replacing the original driveshaft with a replacement driveshaft adapted to receive six replacement gears and being mountable within the original transmission housing;

replacing the original countershaft with a replacement countershaft adapted to receive six replacement countershaft gears and being mountable within the original transmission housing;

placing six replacement driveshaft gears about the replacement driveshaft;

placing six replacement countershaft gears about the replacement countershaft;

positioning the replacement mainshaft, replacement countershaft, and replacement gears within the original transmission housing; and closing the original transmission housing wherein the five speed motorcycle transmission is converted to a six speed motorcycle transmission without modifying the housing.

* * * * *